March 13, 1962    M. H. EASY ETAL    3,025,513
RADAR APPARATUS
Filed Nov. 2, 1956
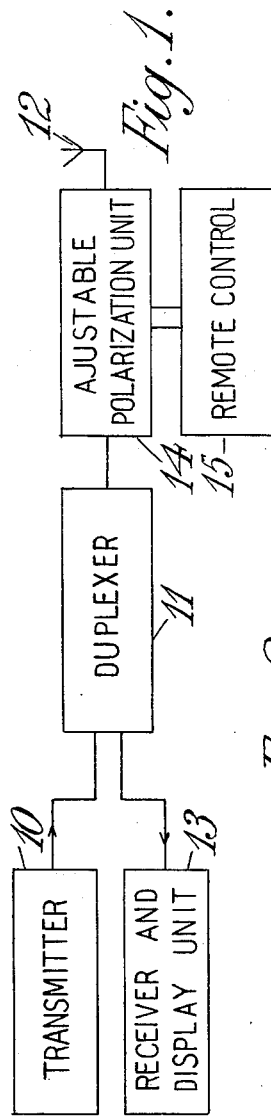
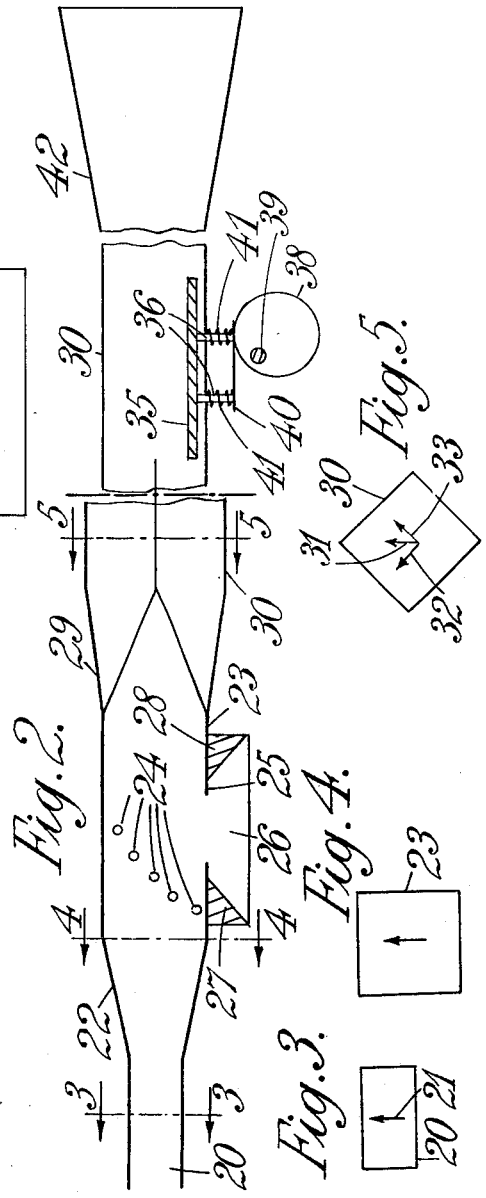

United States Patent Office

3,025,513
Patented Mar. 13, 1962

3,025,513
RADAR APPARATUS
Maurice Henry Easy and Adam Bronislaw Schneider, London, England, assignors to The Decca Record Company Limited, London, England, a British company
Filed Nov. 2, 1956, Ser. No. 620,019
Claims priority, application Great Britain Nov. 4, 1955
9 Claims. (Cl. 343—5)

This invention relates to radar apparatus.

It is a general practice in radar apparatus to radiate either horizontally or vertically polarised signals. However, it has been proposed to radiate circularly polarised signals. If circularly polarised signals having, say, a right-handed direction of rotation are reflected from a flat surface, they would be returned to the radar apparatus with a left-handed direction of rotation and as such will not be accepted by an aerial which transmits right-handed circular polarisation. If, on the other hand, the signals are reflected from a surface formed of two planes at an angle so that a double reflection takes place then the signals would be returned to the radar apparatus with a right-handed direction of rotation and will be accepted by an aerial which transmits right-handed polarisation. Most targets which are to be detected with radar apparatus, such as for example ships or aircraft, have complex reflecting surfaces and will return signals polarised with left and right-handed directions of rotation. On the other hand a rain storm, assuming the drops are spherical, will act in a similar manner to a flat plate and would only return signals with left-handed polarisation. On these theoretical grounds, it would appear that a radar apparatus radiating circularly polarised signals and having a receiver arranged to receive only signals with a similar polarisation would be able to distinguish targets having complex echoing surfaces from rain. For this reason, radar sets have been constructed to radiate circularly polarised signals and, although great care has been taken to ensure that the radiated signals are exactly circularly polarised, such sets have not however been wholly satisfactory in enabling complex targets to be distinguished from rain.

According to this invention radar apparatus is arranged so that the radiated signal is elliptically polarised and adjusting means are provided so that the ellipticity may be varied. Preferably the ellipticity is made variable over a range such that the transmitted signal may be varied from linear polarisation to circular polarisation and the signal may be made variable over the complete range from linear polarisation in a first direction through circular polarisation to linear polarisation at right angles to the first direction. It is found, by varying the ellipticity, that for any particular rain storm there is some setting at which a minimum signal from the rain is received. It is believed that this is due to the fact that the rain drops are not exactly spherical and that for non-spherical drops, depending on their shape, some particular degree of ellipticity gives a minimum signal.

In one arrangement of radar apparatus according to the invention, the feed from the transmitter to the antenna includes a rectangular wave guide which is connected by a transition section to a square waveguide, the square guide being co-axial with the rectangular guide but having its walls in planes at exactly 45° to the walls of the rectangular guide so that a plane-polarised signal in the rectangular guide produces signals in two planes of polarisation at right angles in the square guide, and an adjustable phase shifter is provided in the square guide for adjusting the phase of the signal in one plane of polarisation relative to the signal in the other plane of polarisation.

The aforementioned transition section may include a transition to a first square guide portion having its walls parallel to the walls of the rectangular guide together with a transition for connecting said first square waveguide portion to the aforementioned square waveguide having its walls and planes at 45° to the walls of the rectangular waveguide. Means may be provided in said first square guide portion for attenuating any waves having the electric vector parallel to the longer side of the rectangular wave guide in order to ensure that the output therefrom comprises only the waves directly polarised. This attenuating means may comprise a grid across the waveguide and/or auxiliary guide with a dummy load or loads, said auxiliary guide being coupled to said first square guide portion by a slot arranged to effect coupling only for waves having the electric vector in the unwanted plane.

Conveniently the aforementioned phase shifter comprises a sheet of dielectric material arranged in the waveguide to lie with its plane parallel to one of the sides of the guide, the dielectric sheet being adjustable in a direction transversely to its plane. The dielectric material is made of sufficient length to give the required phase shift and the ends may be shaped for optimum matching. It will be appreciated that a phase shift of 90° in one of the signals relative to the other is necessary to produce circular polarisation. The maximum phase shift will occur when the dielectric material is in the centre of the guide and the minimum phase shift when it is at one or other side of the guide. It will be appreciated that, provided sufficient variation of phase shift is achieved, the maximum amount of phase shift which can be effected by the dielectric material is not critical since, in use, the material is moved across the width of the guide so as to be positioned to give the required phase shift in any particular circumstances. By moving the dielectric material to one side of the guide there will be substantially no relative phase shift between the two signals of different planes of polarisation and hence a linearly polarised signal will be radiated. It may be preferred, in some circumstances, to radiate a linearly polarised signal so as to obviate the inherent 3 db loss which occurs when receiving circularly polarised signals from complex targets using a receiver sensitive to circularly polarised signals of only one direction of rotation. This loss arises because, as explained above the signals from complex targets are reflected as signals polarised in both directions of rotation.

Most conveniently a common transmitting and receiving system is employed with the radar apparatus of the present invention so that a single device may be used for converting a plane polarised output from the transmitter unit into an elliptical polarised signal to be radiated and for converting the incoming received signals into a plane polarised input to the receiver. It would, however, be possible to use a separate receiving antenna in which case a separate adjustable polarisation transformation means would be provided. If a variable phase shifter were used in the transmitter feed as described above, then a similar phase shifter might be employed in the feed to the receiver and the two phase shifters would preferably be coupled to move in synchronism.

Most conveniently a remote control for the phase shifter (or phase shifters) is provided so that the operator at the radar display may control the degree of ellipticity as required. If a phase shifter comprising a plate of dielectric material is used, as described above, this plate might for example be mounted on springs tending to urge it in one direction across the guide and a servo-controlled electric motor provided to operate a cam for pushing the plate in the opposite direction.

The following is a description of one embodiment of the invention, reference being made to the accompanying drawings in which:

FIGURE 1 is a block diagram of a pulse radar apparatus;

FIGURE 2 is a diagrammatic representation showing in further detail part of the radar apparatus of FIGURE 1; and FIGURES 3, 4 and 5 are diagrams showing the section of waveguide along the lines 3—3, 4—4 and 5—5 respectively of FIGURE 2.

Referring to FIGURE 1 there is shown a pulse transmitter 10 for generating radio frequency pulses which are fed through a duplexer 11 to an antenna 12. Echo signals received by the antenna 12, after passing through the duplexer 11, are fed to a receiver and display unit 13. Between the duplexer 11 and the antenna 12 there is provided an adjustable polarisation unit 14 which will be described in further detail later, this unit being controlled by a remote control system 15.

Referring to FIGURES 2 and 5 there is shown in further detail the adjustable polarisation unit 14. The transmitted signals from the duplexer 11 are fed into a waveguide 20 which is of rectangular section as shown in FIGURE 3. These signals are transverse electric signals with the electric vector parallel to the shorter sides of the guide as indicated by the arrow 21 in FIGURE 3. The rectangular waveguide 20 opens out into a transition section 22 connecting the rectangular guide 20 to a square waveguide 23, coaxial with the rectangular waveguide 20 and having a section as shown in FIGURE 4. The polarisation of the transmitted signals in the square waveguide 23 will be the same as the polarisation of the signals in the rectangular guide 20. In this square waveguide 23 there is provided, for reasons described later, a grating 24 comprising a number of thin wires transverse to the direction of polarisation of the transmitted signals. The square waveguide 23 also has a rectangular slot 25 in one of its walls opening into a length of rectangular waveguide 26 which slot is arranged to be non-radiating for the signals of the required polarisation but to couple signals of transverse polarisation strongly into the rectangular waveguide 26 where they are absorbed by dummy loads 27, 28. The square waveguide 23 is connected by the transition section 29 to a further square waveguide 30 of similar section to the waveguide 23 but having the planes of its walls twisted at 45° to the planes of the walls of waveguide 23 as is shown in FIGURE 5. The plane of polarisation of the signals fed into the waveguide 30 is thus at 45° to the planes of the walls as shown by the arrow 31 in FIGURE 5 and these signals may be considered as having components 32, 33 polarised in the two planes parallel to the walls. The square waveguide 30 continues past the break at the chain line A—A on FIGURE 2 but, for convenience of illustration, the part to the right of the line A—A has been shown in section parallel to one of its walls. It is to be understood however that there is no twist in the guide and that the signals are still polarised in the manner indicated by the arrow 31 in FIGURE 5. In the part of the waveguide 30 to the right of the line A—A, there is provided a dielectric phase shifter comprising a sheet of dielectric material 35 arranged in the guide with its plane parallel to one of the sides of the guide. This sheet of dielectric material is mounted on dielectric rods 36 so as to be adjustable in position across the guide in a direction transversely to its plane. Such a phase shifter will introduce a phase shift in one of the components 32, 33 but not in the other, the amount of phase shift depending on the position of the sheet 35 in the guide. The maximum phase shift will occur when the sheet 35 is central in the guide and the minimum phase shift when it is at one or other side. This phase shifter thus enables the relative phase of the components 32, 33 to be varied and hence the output signal after passing this phase shifter can be considered as being, in general, an elliptically polarised signal. When the sheet 35 is at one side of the guide 30, there will be substantially no phase shift introduced and hence the output will be a linearly polarised signal. The phase shifter is constructed to provide a phase shift of at least 90° and preferably 180° so that the output may be varied from linearly polarised at least to circularly polarised and if 180° of phase shift is available, on to linear polarisation in a direction at right angles to the former phase of polarisation. The phase shifter may be remotely controlled and there is indicated diagrammatically control means comprising a cam 38 on a shaft 39, which cam bears against a cam follower 40 on the rods 36 so that by rotation of the shaft 39 the dielectric material 35 is pushed inwardly towards and possibly beyond the centre of the waveguide. Springs 41 serve to hold the cam follower 40 in contact with the cam 38. From the phase shifter, the signals are fed into a horn 42 and in turn may illuminate a reflector of an antenna system in the conventional manner.

It will be appreciated that the adjustable polarisation unit described with reference to FIGURES 2 to 5 serves not only to convert plane polarised signals fed into the rectangular waveguide 20 into signals of adjustable elliptical polarisation but will also convert received signals of corresponding elliptical polarisation received at the horn 42 back into plane polarised signals in the rectangular waveguide 20 polarised in the direction of the arrow 21 in FIGURE 3. If any signals polarised differently are received, they would tend to produce, due to the phase shifter and transition sections, signals in the guide 20 at least having a component polarised at right angles to the direction indicated by the arrow 21 but such a component would be prevented from reaching the guide 20 by the grating 24 and would be coupled into the guide 26 to be absorbed by the dummy loads 27, 28. Alternatively, the dummy loads 27, 28 may be replaced by another receiver to detect signals of opposite polarity, the resultant signals being used for comparison with, or in addition to, the signals passed to the main receiver 13. The system therefore may be used for both transmitted and received signals as has been described with reference to FIGURE 1 and will discriminate against signals polarised differently from the transmitted signals. In operation, if it is required to reduce signals from rain echoes, the phase shifter in the adjustable polarising unit 14 is adjusted until the unwanted signals are at a minimum. It will be appreciated that if the apparatus is adjusted in this manner, it is not necessary in any way for the phase shifter to be calibrated or even for the operator to know in what manner the radiated signals are polarised.

The adjustable polarising unit need merely be adjusted to reduce the unwanted signals to a minimum. As previously explained, however, it may in some circumstances be preferred to radiate a linearly polarised signal so as to obviate the inherent 3 db loss which occurs when receiving circularly polarised signals from complex targets using a receiver sensitive to circularly polarised signals of only one direction of rotation and preferably, therefore, the phase shifter control is suitably calibrated to enable it to be adjusted to give linear polarisation when required.

We claim:

1. In radar apparatus having a transmitter and an antenna, a feed from the transmitter to the antenna comprising a rectangular waveguide, a first square waveguide coaxial with the rectangular guide but having its walls in planes at 45° to the walls of the rectangular guide, a transition section connecting said rectangular waveguide to said first square waveguide, which transition section includes a transition to a second square guide portion having its walls parallel to the walls of the rectangular waveguide together with a transition connecting said second square guide portion to said first square waveguide having its walls in planes at 45° to the walls of said rectangular waveguide, means in said second square guide portion for attenuating any waves having the electric vector parallel to the longer side wall of said rectangular waveguide, and an adjustable phase shifter in said first square waveguide for adjusting the phase of the signals polarized in a plane parallel to one of the walls of said first square waveguide relative to the phase of the signals polarized in a plane parallel to an adjacent wall of said first square waveguide.

2. Radar apparatus as claimed in claim 1 wherein said attenuating means comprise a grating across the waveguide.

3. Radar apparatus as claimed in claim 1 wherein said attenuating means comprise an auxiliary guide with a dummy load, said auxiliary guide being coupled to said first square guide portion by a slot arranged to effect coupling only for waves having the electric vector in the unwanted plane.

4. Radar apparatus as claimed in claim 1 wherein said phase shifter comprises a sheet of dielectric material arranged in the guide to lie with its plane parallel to one of the sides of the guide, the dielectric sheet being adjustable in a direction transversely to its plane.

5. Radar apparatus as claimed in claim 4 wherein the dielectric sheet is of sufficient length, in the axial direction of the guide, to give a range of phase shift of at least 180°.

6. Radar apparatus as claimed in claim 1 wherein a remote control is provided for said phase shifter.

7. In pulse radar apparatus having a common antenna and a pulse transmitter and receiver connected to a duplexer, a feed system between the duplexer and the antenna comprising a length of rectangular waveguide coupled at one end to the duplexer and connected at the other end by a transition section to a square waveguide, the transition section including means for attenuating any waves having their electric vector parallel to the longer side wall of the rectangular guide and the square waveguide being coaxial with the rectangular guide but having its walls in planes at 45° to the walls of the rectangular guide, an adjustable phase shifter in said square waveguide for adjusting the phase of the signals polarized in a plane parallel to one wall of the guide relative to the phase of signals polarized in a plane parallel to an adjacent wall of the guide, and means connecting said square waveguide to said antenna.

8. In pulse radar apparatus having a common antenna and a pulse transmitter and receiver connected to a duplexer; a feed system between the duplexer and the antenna comprising a first length of square waveguide coupled at one end to the transmitter for transmitting plane polarized waves polarized in a plane parallel to one face of the square guide, a second length of square waveguide, a transition section coupling the other end of said first length of square waveguide to one end of said second length of square waveguide, which second square waveguide is co-axial with the first square waveguide but has its walls in planes at 45° to the planes of the walls of the first square waveguide, an adjustable phase shifter in said second square waveguide for adjusting the phase of signal components in the second square waveguide polarized parallel to one wall of the guide with respect to signal components polarized parallel to an adjacent wall of the guide, and means coupling the other end of said second square waveguide to said antenna.

9. In pulse radar apparatus having a common antenna and a pulse transmitter and receiver connected to a duplexer; a feed system between the duplexer and the antenna comprising a length of rectangular waveguide coupled at one end to the transmitter for transmitting plane polarized waves polarized in a plane parallel to the narrow faces of the rectangular guide, a first square waveguide, a first transition section coupling the other end of said rectangular waveguide to one end of said first square waveguide, which first square waveguide is co-axial with the rectangular guide and has its walls parallel to the walls of the rectangular guide, a second square waveguide, a second transition section coupling the other end of said first square waveguide to one end of said second square waveguide, which second square waveguide is co-axial with the first square waveguide, an adjustable phase shifter in said second square waveguide for adjusting the phase of signal components in the second square waveguide polarized parallel to one wall of the guide with respect to signal components polarized parallel to an adjacent wall of the guide, and means coupling the other end of said second square waveguide to said antenna.

References Cited in the file of this patent

UNITED STATES PATENTS

| | | |
|---|---|---|
| 2,480,682 | Stiefel | Aug. 30, 1949 |
| 2,599,753 | Fox | June 10, 1952 |
| 2,607,849 | Purcell et al. | Aug. 19, 1952 |
| 2,611,087 | Alford | Sept. 16, 1952 |
| 2,619,635 | Chait | Nov. 25, 1952 |
| 2,645,769 | Roberts | July 14, 1953 |
| 2,741,744 | Driscoll | Apr. 10, 1956 |

FOREIGN PATENTS

| | | |
|---|---|---|
| 597,258 | Great Britain | Jan. 21, 1948 |